3,586,626
GEL CHROMATOGRAPHY PROCESS
Walter Heitz, Wiesbaden-Kostheim, and Karl-Ludwig Platt and Werner Kern, Mainz, Germany, assignors to E. Merck AG, Darmstadt, Germany
No Drawing. Filed Mar. 27, 1967, Ser. No. 625,947
Claims priority, application Germany, Mar. 31, 1966, M 68,996
Int. Cl. B01d 15/08
U.S. Cl. 210—31
9 Claims

ABSTRACT OF THE DISCLOSURE

Novel chromatographic gels are produced by copolymerization, with simultaneous or subsequent cross-linking, of vinyl esters or vinylene carbonates containing up to 20 carbon atoms with one or more cross-linkable vinyl compounds such as divinyl or diallyl esters of dicarboxylic acids, epoxy compounds, divinyl ethers of alkane diols and other well-known cross-linkable vinyl compounds. The resultant gels can be partially or completely saponified and then employed in the separation of substances with varying molecular weights employing known chromatographic techniques.

DISCLOSURE

Various substances are known which can be used as molecular micro-filters in gel chromatography, such, for example as polystyrene cross-linked with divinyl benzene, polymethyl methacrylate cross-linked with ethylene glycoldimethacrylate, acrylic amide cross-linked with methylene-bis-acrylic amide, as well as cross-linked dextranes, celluloses, polysaccharides and polyvinyl alcohols.

It has now been found that particularly advantageous gels can be obtained suitable for gel-permeation chromatography, by copolymerizing a vinyl ester and/or a vinylene carbonate, containing up to 20 C-atoms, with one or several cross-linkable vinyl compounds while at the same time causing a cross-linking either directly or alternatively in a subsequent reaction. The products obtained in this manner can be subsequently either partially or completely saponified.

These new agents for gel chromatography of the present invention possess the particular advantage in that the organophilic copolymers per se can be partially saponified, if desired by hydrolysis, and thus can be converted into gels with defined hydrophilic characteristics. In addition the completely saponified hydrophilic gels according to the invention have the advantages of an increased constancy of hydrolysis and of a considerably greater resistance against attack by bacteria or fungi, especially as compared to the cross-linked dextrane gels of the prior art.

Through the copolymerization of the vinyl esters or of the vinylene carbonates with the cross-linked component, gels can be obtained with particularly advantageous characteristics, in contrast to products which have been manufactured through subsequent cross-linking of soluble polymers. The polymers in accordance with the invention show in their molecular structure an essentially greater inhomogeneity, as a result of which there are achieved considerably more favorable mechanical characteristics of the gels. Consequently the completely saponified gels according to the invention show considerably greater strength of the gel particles, as compared to subsequently cross-linked polyvinyl alcohols with equal contents of cross-linking agents, so that greater filtering speeds, with use of pressure if desired, and longer columns will be possible during chromatography thus giving greater separating performances. Examples of cross-linkable vinyl compounds include, among others, a divinyl ether of an alkane diol, for example, 1,4-butane diol-divinyl ether, a divinyl ether of oligomer ethylene glycol, for example, diethylene glycol divinyl ether, and tetraallyl silane.

The production of the new agents through bead polymerization offers particular advantages. Such polymerization can be carried out particularly well whenever an alcohol and/or an ether, preferably a mixture of hexanol and di-n-butyl ether, are present. Particularly good products can also be obtained when the bead polymerization is carried out in the presence of a mixture consisting of n-heptanol, n-octane and polyvinylpyrrolidone.

All esters from carboxylic acids with 1 to 18 C-atoms can be used as the vinyl esters, preferably the vinyl esters of the low fatty acids with up to 4 C-atoms, such as the formates, acetates, propionates and butyrates. Preferably vinyl acetate or vinyl propionate is employed inasmuch as these compounds are commercially readily available. However, there can also be used with advantage, and especially for special purposes of application, vinyl esters of the higher fatty acids, especially stearic, palmitic, myristic and lauric acids. In addition to the esters of aliphatic monocarboxylic acids there can be employed, for the production of the new gels, the vinyl esters of aliphatic dicarboxylic acids, as well as the vinyl esters of aromatic or cycloaliphatic acids such as, benzoic acid, toluic acid, cyclohexane carboxylic acid, succinic acid, adipic acid, glutaric acid and malonic acid. For special fields of application, it will also be advantageous to employ mixtures of these vinyl esters among themselves or with vinylene carbonate. The mixtures of vinyl esters of low aliphatic carboxylic acids with up to 20% of esters of the higher fatty acids are particularly preferred.

In order to obtain the gels according to the invention, suitable for chromatography, the vinyl ester and/or the vinylene carbonate is copolymerized with cross-linkable vinyl compounds. The structure $CH_2=CH-$ is desired in this case inasmuch as both the actual vinyl compounds as well as the corresponding allyl compounds (containing the vinyl group), can be used. Substances capable of cross-linking are, as is well-known, those materials which have two groups capable of reaction in the molecule, by means of which the combination of the polymer chains can take place. As a rule, these groups capable of cross-linking have been arranged terminally. Vinyl compounds capable of cross-linking include those which contain at least two vinyl groups in the molecule and wherein these vinyl groups are combined through C—C-bonds. Particularly suitable are $\alpha,\omega$-divinyl alkylenes with up to 20 C-atoms, for example, 1,5-hexadiene, 1,9-decadiene or 2-chlorobutadiene. Additionally, however, it is also possible according to this invention to use compounds in which, instead of through alkylene groups, the vinyl groups have been combined through heteroatoms or groups, such as through Si, $SO_2$ or O as in diallyl dimethyl silane, methyl triallyl silane, tetraallyl silane, divinyl or diallyl sulfone as well as the vinyl or allyl ethers of 2- to 6-valent alcohols which can be only partially etherified such as, alkane diol divinyl or diallyl ether including for example the divinyl or diallyl ethers of ethylene glycol, propylene glycol, butane diol, hexane diol as well as the di- or trivinyl or allyl ethers of glycerine, or divinyl or diallyl ethers of sorbitol. Furthermore, divinyl or diallyl ethers of di- or triethylene glycol, as well as those of polyethylene or polypropylene glycols and trivinyl and triallyl ethers of polypropylene triol can also be employed.

Additional compounds suitable for the cross-linking of vinyl esters or of vinylene carbonate are, divinyl or diallyl esters of dicarboxylic acids, in which the saponification is made difficult through stearic hindrance. The esters of terephthalic acid, of tetramethyl succinic acid and of cyclohexane-(1,4-dicarboxylic acid are highly preferred. In addition to such compounds, which have two $CH_2=CH$- groups, there are other substances suitable for the cross-linking of vinylene carbonate or of vinyl esters which contain at least one other group capable of cross-linking which is not a vinyl group. Such groups are, preferably, epoxy or aldehyde groups. Compounds with an epoxy group are, for example, butadiene monoepoxy, vinyl cyclohexamonoepoxy or alloocimene dioxide. These epoxys may be copolymerized in the customary manner with vinylene carbonate or with vinyl esters, whereby, first of all, linear polymeric compounds with free epoxy groups will develop. The actual cross-linking takes place subsequently; at the same time either an immediate reaction of the epoxys after an ionic mechanism may take place, which is catalyzed, for example through alkali alcoholates, or the epoxy groups can react with one bi-functional compound, whereby a cross-linking of the polymer chains via the bridges will take place. Such bi-functional compounds are polyvalent, preferably 2- to 6-valent alcohols such as glycol, glycerine, or sorbitol, butane diol, hexane diol, decane diol, propylene glycol, pentaerythrite, diethylene glycol, triethylene glycol, or compounds such as glycerine glycol. Such conversions between epoxys and alcohols have been known per se and have been often described in the literature. If a compound with an aldehyde group is used as a vinyl compound capable of cross-linking, then acrolein is preferred in which case the cross-linking will take place with but slight saponification during the polymerization which is thereafter completed during a succeeding partial or total saponification.

The manufacture of the cross-linked copolymers of the vinylene carbonate and/or of the vinyl ester with up to 20 C-atoms can take place according to any of the customary methods. Thus, the polymerization can be carried out in bulk, in solutions, in emulsion, or as a precipitation or bead polymerization. The bead polymerization is preferred for the manufacture of the gels according to the invention, since in this case the particular size of the gels can be controlled from the beginning and thus losses can be avoided, which otherwise may develop during the crushing and filtering (sifting). The preferred particle size of the gels lies, depending on the purpose for which their application is planned, between 0.001 and 5 mm., preferably between 0.01 and 0.5 mm. The production of the gels according to the invention through bead polymerization offers moreover the advantage that it can be carried out as an oil-in-water polymerization, which, as is well-known, is much more easily controlled technically than the polymerization in the reverse distribution of phases, which would be the only one possible in the case of the subsequent cross-linking of polyvinyl alcohol. The bead polymerization itself takes place according to the customary processes described in the prior art. Frequently a radical initiation is preferred, which can be accomplished through use of oxidation agents such as peroxides, especially dibenzoyl peroxide, dilauroyl peroxide, di-o-tolyl peroxide, hydrogen peroxide, or salts of the peroxy of disulfuric acid or through azoiso-butyric-dinitrile. A redox initiation may also be employed, such as through the use of the system sodium dithionate-alkali peroxy disulfate. The initiators can be added in a known manner in concentrations on 0.01 to 10%, preferably 0.1 to 2%. The bead polymerization itself is carried out, generally speaking, in temperature ranges of from about 20° C. to the boiling point of the monomer with the lowest boiling point, preferably, at about 50 to 80° C.

The polymerization may also be carried out as a bulk, solution or precipitation polymerization with ionic initiation, wherein generally lower temperatures may be employed such as in the presence of Lewis-acids as catalyzers. Both the bead as well as the emulsion polymerization are carried out in the presence of water. In order to prevent a premature discontinuance of the polymerization, it is advisable that the reaction take place at pH-values between 5 and 8, preferably at 7.5, normally controlled by adding buffer substances in aqueous solution, such as alkali phosphates, citrates or tertiary amines. In the case of emulsion and bead polymerization, the customarily used surface active substances are added, preferably ionogenic substances such as, soaps or paraffinic sulfonates in the customary concentrations of 0.01 to 10%, preferably 0.1 to 2%. In the case of bead polymerization, generally speaking, water soluble colloids are preferred, especially polyvinyl alcohol or partially saponified polyviny acetate, polyvinylpyrrolidone, starch, pectins and similar substances known for this particular purposes. In this case, concentrations of 0.01 to 10%, preferably 0.1-2%, are preferred. The relationship of the organic to the aqueous lies, in the case of bead polymerization, generally speaking, at between 1:1 and 1:20 preferably between 1:3 and 1:5.

Through variation of the polymerization conditions, it is possible to influence the size of the pores of the compounds according to the invention. An essential possibility consists in the variation of the concentration of the added cross-linking agent. With an increasing proportion of the cross-linking agent, the gels become less capable of swelling and their stability of shape is increased.

A further method of influencing the development of the pores consists, particularly in the case of bead polymerization or in the case of polymerization in bulk, in the addition of certain substances which are added either before or during the polymerization. For this purpose, such thinning agents should be taken into consideration in the first place which will be solvents for the inserted monomer and which will be swelling agents for the developing polymer for example, ethyl acetate; furthermore, such substances which are a solvent for the monomer may be a precipitation agent for the polymer. To these belong, for example, aliphatic hydrocarbons such as octane, dodecane, petroleum ether, or alcohols, such, especially as hexyl alcohol, decyl alcohol, heptyl alcohol or amyl alcohol and ether, preferably dibutyl ether. It is also possible to insert several such solvents at the same time. But it is also possible to build in such inert substances, without chemical bond, into the polymer, which are removed again later on from the gel. For this purpose particularly, polymers such as polyvinyl acetate, polystyrene as well as alkaline earth carbonates, especially calcium carbonate, sugar or salts, such as NaCl, may be employed. The additive substances must naturally be harmonized with the remaining polymerization conditions, especially to the solvents and/or precipitating and/or suspending agents used. Depending on the desired pore size of the gel, it will naturally also be possible to use various such additive substances simultaneously. Through these additives one can achieve the most diverse exclusion limits. The exclusion limit is a measure of the pore diameter of a gel and is customarily given in terms of the molecular weight of the smallest molecules which are unable any longer to penetrate into the pores of the gel. Thus, one will achieve exclusion limits through adding of precipitation agents/ solvents up to molecular weights in the range of about $10^7$, preferably $10^3$ to $10^6$. The addition of soluble polymer substances makes possible the manufacture of gels with exclusion limits which are in the order of values of the molecular weights of the polymers that have been built into them. Through addition of solid substances, which are again removed after production of the gel, one can even produce gels with considerably higher exclusion limits.

The gels obtained in accordance with the invention through cross-linking of vinyl esters of vinylene carbonates can be largely changed in their characteristics through partial or complete saponification and, particularly, can be made hydrophilic. One of the particular advantages of the new gels lies in the fact that the saponification can be discontinued at any desired stage so that gels can be produced, depending on the purpose for which they have been planned, with various organophilic or hydrophilic characteristics. Normally, the saponification is carried out either in the acid or in the alkaline medium although insofar as vinyl formate has been used for the production of the gels, the saponification can also be carried out through simple heating with water. Alkaline saponification is used, preferably, in those cases where a total saponification is desired. Normally, the reaction takes place with alcoholic alkali, preferably through methanolic or ethanolic solutions of alkali or alkaline earth hydroxides. Besides methanol and ethanol, other alcohols can be employed such as isopropanol as well as alcohol/water mixtures. The gels are allowed to stand with the alkali at room temperature either several hours or up to several days or by boiling for a few minutes or hours with reflux. The saponification can also be carried out in a purely aqueous solution, but then the required saponification times are considerably longer.

The acid saponification is preferred in those cases whenever a partial saponification is desired. It can be carried out in an aqueous solution with the addition of strong acids, for example hydrochloric acid, sulfuric acid, hydrobromic acid, phosphoric acid or p-toluene sulfonic acid. If the reaction takes place at higher temperatures (about 100° C.), then one can insert the acids in weaker concentrations, while in the case of use of stronger concentrations (15 to 20%), the saponification will take place even at low temperatures (20 to 60° C.). If the reaction is carried out at room temperature stirring may be necessary and for several hours. The saponification can also be conducted in such a manner that, for example, a cross-linked polymer obtained from vinyl acetate can be treated in the presence of methanolic hydrogen chloride with methanol. Through re-esterification there develops at the same time methyl acetate which can be distilled away, while the saponified cross-linked polyvinyl alcohol remains. It is also possible to liberate the hydroxyl groups of the vinyl ester or of the vinylidene carbonate in the cross-linked polymer through aminolytic processes. Thus, the gel made from vinyl acetate, for example, can be reacted with low secondary amines such as diethylamine, dimethylamine, piperidine or morpholine, whereby the polyvinyl alcohol gel is obtained in addition to substituted acid amides which are easily capable of being washed out. This process is particularly advantageous in the case of the production of partially saponified gels, since the degree of saponification can be regulated particularly well through addition of amine.

The gels obtained according to the invention are normally insoluble in the customary solvents. The unsaponified (organophilic) gels are easily capable of swelling in most organic solvents. The saturated hydrocarbons, which cause only a small degree of swelling such as n-hexane, or no swelling at all as for example n-octane in the case of cross-linked polyvinyl acetate gels, form an exception. Naturally, the swelling behaviour of the gels depends largely on the ester component of the polyvinyl esters. Thus naturally, gels, which have been produced entirely or partially from vinyl stearate, have considerably more organophilic characteristics and show a greater capability of swelling, as compared to hydrocarbons, than do such gels which have been produced from vinyl acetate or even from the very hydrophilic vinyl formate. The saponified gels are capable of swelling with water and also with the lower alcohols. Depending on the contents of the cross-linking agent, the saponified gels can absorb a multiple of their volume in water through swelling.

The gels according to the invention can be used for practically all separations in which gel-permeation chromatography is employed. As is known, a separation dependent on the molecular weight will take place at the same time. Molecules above a certain particle size (exclusion limit) cannot penetrate at all into the pores of the gel and will be washed out first. Substances with a molecular weight within the area of or below the exclusion limit of the pertinent gel are, generally speaking, washed out the more slowly the smaller their molecular weight.

The new gels can be used for the separation of substances with very widely differing molecular weights. The gel is selected with a view to the planned purpose of use, that is to say the substances to be separated, the desired separation capacity and the filtering speed. Both low molecular as well as high molecular substances can be separated with the help of the gels according to the invention. The new gels are particularly well suited for the separation of substances with molecular weights above 500, for example above 1,000, because such substances can only be separated with difficulty by way of other methods.

Special applications of the new gels include the determination of the distribution of molecular weight of polymers. In the oligomeric area, substances can be isolated homogeneously with regard to molecules. It is also possible to separate substances of equal molecular weight one from the other whenever the polarity shows sufficient differences. Thus, it is possible to dissect oligomeric phenylenes, oligomeric urethanes, oligomeric ethylene glycols and oligomeric styrenes into fractions which are homogeneous according to molecules. In the case of polymers such as polystyrene, polyvinyl acetate or polyvinyl chloride, the distribution of molecular weight can be determined up to molecular weights of about $10^6$. The new gels of this invention can also be used advantageously for the separation of colloidal substances from substances in a genuine solution, especially also for the separation of sensitive colloids, such as enzymes or viruses. Advantages also result in the case of the treatment of mixtures which contain proteins or polypeptides, such as plasma protein, enzyme such as pepsin or pancreatic enzymes or hormones, for example insulin. Also, the separation of polysaccharides such as amylodextrins, heparins and amylases may be carried out advantageously according to this invention.

Additionally, the new gels can also be used for severing of complicated mixtures which contain several quite different compounds, for example biological liquids such as plant extracts or extracts from microorganisms or animal organs. At the same time, both a severing as well as a purification can take place such for example as in the fractionated severing of blood plasma, sera, enzymes and other proteins, peptides, nucleic acids, vitamins, co-enzymes, hormones, anti-biotics, alkaloids and carbohydrates. These hydrophilic gels especially suitable for separations of high molecular and ionic substances such as for desalinification from albuminous substances (proteins), which can be carried out quantitatively and without losses, whereby the high molecular portion is washed out in the first fractions of the gel chromatography. In a similar manner, one can convert high molecular natural substances such as albuminous substances, carbohydrates and nucleic acids from one ionic environment into another ionic environment. At the same time both the nature of the ions, their concentration and/or the pH-value of the solution can be changed.

The technique of application of the new gels according to the invention does not differ from that of the known stationary phases in gel chromatography. Customarily, the gels are filled into columns which are flown through in a descending and ascending manner by the elution agents. Frequently, it will be practical, during the filling of the column, to let the solvent flow in order to achieve an even packing of the gel. The gel must be preswelled until it reaches a state of equilibrium and normally the same solvent is used for this preswelling that has been provided for the subsequent elution. In many cases it will also be advantageous in the case of the production of hydrophilic gels to carry out the saponification simultaneously with the preswelling so that the gels can be obtained in a swelled condition and can be used immediately after washing out. For practical purposes, the gels should be filtered prior to the saponification. Occasionally it will also be found helpful, for purposes of saving time, to carry out the chromatography under pressure. The use of higher temperatures such as 30 to 150° C. in the case of gel chromatography also favors the standardization of the equilibrium and, thus, frequently is found to increase the sharpness of the separation.

Mixtures of the new gels can also be used for the chromatography. Such mixtures will be particularly desired, whenever a wider distribution of pore sizes is to be achieved, with which a larger area of molecular weight can be determined or in the case of separation of polymers with high and low molecular portions.

The following examples illustrate how the invention may be practiced.

(A) PRODUCTION OF GELS

Example 1

(a) 1200 ml. of a 0.5% polyvinyl alcohol solution are filled into a flask. The air is displaced by nitrogen and the solution is heated to about 80° C. While stirring vigorously, an end-stabilizer mixture consisting of 99.5 g. vinyl acetate and 0.5 g. butane diol-(1.4)-divinyl ether and 0.2 g. azoisobutyrodinitrile is dripped in. Through the addition of 6 g. $Na_2HPO_4$ and 0.35 g. $NaH_2PO_4$, the pH-value of the solution is adjusted to about 6 to 8. After about 5 hours, the reaction mixture is mixed with 3 l. of water. The bead polymer that develops settles on the bottom. The water is decanted and the polymer is washed several times with water and is subsequently dried. Yield is 90 to 95%. Specific gel bed volume (tetrahydrofuran): 8.7 ml./g.

(b) 50 g. of the gel, produced according to Example 1(a), are stirred in a solution of 20 g. NaOH in 500 ml. of methanol for 10 hours under nitrogen, the gel is sifted, filtered and is washed carefully with methanol and water. The swelling agent is removed in a rotary evaporator.

EXAMPLE 2

(a) Analogously to Example 1 (a), a mixture of 184 g. of vinyl acetate, 16 g. of butane diol-(1.)-divinyl ether and 0.5 g. azoisobutyrodinitrile, suspended in 1,000 ml. of a 0.5% polyvinyl alcohol solution, is polymerized and worked up. Yield is about 95%. Gel bed volume (tetrahydrofuran): 3.9 ml./g.

(b) 50 g. of the gel produced in accordance with Example 2(a) are stirred with 500 ml. of an 80% hydrochloric acid under nitrogen for 10 hours and are worked up analogously to Example 1(b). Insofar as the product had been sifted (prior to saponification) to the desired bead size, the suspension that has been well washed with water can be used directly.

(c) 5 g. each of the polyvinyl acetate gel, cross-linked with 8 % butane diol-(1,4)-divinyl ether, are weighed into a 100 ml. Erlenmeyer flask and are partially saponified under variable conditions at room temperature. Subsequently the gel is rinsed with water onto a suction filter, is washed neutrally and is dried in a vacuum drier until it reaches constancy of weight. The following products are obtained:

| Sample | 1 | 2 | 3 | 4 | 5 | 6 |
|---|---|---|---|---|---|---|
| Concentrated HCl (ml.) | 0 | 5 | 5 | 5 | 5 | 5 |
| $H_2O$ (ml.) | 0 | 5 | 5 | 5 | 15 | 5 |
| $CH_3COOH$ (ml.) | 0 | 0 | 0 | 0 | 0 | 10 |
| Time (hours) | 0 | 1 | 5 | 24 | 24 | 24 |
| Dry weight of the saponified sample | 5 | 4.8 | 3.4 | 3.1 | 4.9 | 3.8 |
| Acetyl group contains (nonsaponified product=100) | 100 | (¹) | 49 | 25 | (¹) | 62 |

¹ About 100.

Example 3

Analogously to Example 1(a), a mixture of 184 g. of vinyl acetate, 16 g. of butane diol-(1.4)-divinyl ether, 86 g. of amyl alcohol and 0.5 g., azoisobutyrodinitrile, suspended in 1,200 ml. of 0.5% polyvinyl alcohol solution, is polymerized and worked up. Yield is 90%. The bead polymer obtained has a macroporous structure and high mechanical stability. Gel bed volume (tetrahydrofuran): 6.6 ml./g.

Example 4

A mixture consisting of 50 g. of vinyl propionate, 2 g. of diethylene glycol-divinyl ether and 0.3 g. dibenzoyl peroxide is dripped into a reaction vessel, heated to 80° C. and rinsed with nitrogen, in the course of about 2 hours. After 3 hours, the temperature is raised to 120° C. After another 2 hours the reaction mixture is cooled down to room temperature and is ground up. The product is an unmeltable, colorless resin which is not soluble in tetrahydrofuran but is swellable.

Example 5

100 g. of vinyl acetate and 4 g. of diethylene glycol-divinyl ether are destabilized (through distillation), and are heated up to 80° C. with a solution of 5 g. of an emulsifier (mixture of sodium-alkyl sulfonates), 0.5 g. of potassium peroxy disulfate and 0.2 g. of sodium dithionite, in 300 ml. of water while nitrogen is passed over it while stirring. the pH-value of the solution is kept, if need be through repeated addition of a sodium phosphate buffer solution, at about 7.5. After about 2 hours, the reaction mixture is cooled down to room temperature, the polymer is sucked away and washed with water. After drying in a vacuum drier for 14 hours at about 50° C., there is obtained a colorless powder with a particle size below $10^{-3}$ mm., which have agglomerated to some extent into larger particles.

Example 6

Analogously to Example 1(a), a mixture consisting of 150 g. of vinyl acetate, 45 g. of vinyl stearate and 5 g. of butane diol-(1,4)-divinyl ether is suspended with 0.6 g. of azoisobutyrodinitrile as initiator in 1,000 ml. of a 0.5% aqueous polyvinyl alcohol solution, is polymerized at 80° C. and worked up. Gel bed volume (tetrahydrofuran): 5 ml./g.

Example 7

Analogously to Example 1(a), a mixture consisting of 195 g. of vinyl acetate and 5 g. of hexane diol-(1.6)-divinyl ether is suspended with 1 g. of azoisobutyrodinitrile as initiator in 1,500 ml. of a 0.5% aqueous polyvinyl alcohol solution, is polymerized at 80° C. and is worked up. Gel bed volume (tetrahydrofuran): 4.8 ml./g.

Example 8

A mixture consisting of 50 g. of vinyl acetate, 5 g. of tetraallyl silane and 0.2 g. of azoisobutyrodinitrile is put in portions into a flask equipped with a reflux cooler, which flask is rinsed with nitrogen and heated to 80° C. After 3 hours it is cooled and the mixture crushed mechanically to a particle size of about 0.5 mm. The polymer is insoluble, but it is swellable in solvents such as tetrahydrofuran and methanol.

Example 9

Analogously to Example 1(a), a mixture of 188 g. of vinyl acetate, 12 g. of butane diol-(1,4)-divinyl ether and 0.4 g. azioisobutyrodinitrile, suspended through vigorous stirring in 1,200 ml. of a 0.5% polyvinyl alcohol solution, is polymerized and worked up. Yield is 90–95%. Gel bed volume (tetrahydrofuran): 4.1 ml./g.

Exampel 10

(a) Analogously to Example 1(a), a mixture of 198 g. of vinyl acetate, 2 g. of butane diol-(1.4)-divinyl ether and 0.4 g. azoisobutyrodinitrile, suspended in 1,200 ml. of a 0.5% polyvinyl alcohol solution, is polymerized and worked up. Gel bed volume (tetrahydrofuran): 7.5 ml./g.

The swelling of this gel is determined in various solvents. Each 1 g. of the dry gel is covered with 20 ml. layers each of the solvent. The gel bed volumes (ml./g.)

are: hexane 2.5; cyclohexane 3.0; n-heptane 1.8; n-octane 1.8; benzene 6.7; toluene 5.0; methylene chloride 10.0; chloroform 10.0; carbon tetrachloride 7.5; chlorobenzene 7.3; o-dichlorobenzene 6.9; methanol 4.2; ethanol 3.5; i-amyl alcohol 4.0; diethyl ether 4.6; di-n-butyl ether 3.1; tetrahydrofuran 7.2; dioxane 7.7; ethyl acetate 6.8; n-butyl acetate 5.5; acetone 6.9; methyl ethyl ketone 6.6; dimethyl formamide 7.4; and dimethyl disulfide 4.8.

(b) 50 g. of a sifted gel, produced according to Example 10(a), are stirred under nitrogen with a solution of 25 g. of NaOH, 415 ml. methanol and 415 ml. of water for about 10 hours at room temperature and are then heated for 2 hours to 60° C. The saponified gel is preserved under water in its swelled state. It has a gel bed volume of 170 ml.

Example 11

(a) Analogously to Example 1(a), a mixture of 196 g. of vinyl acetate, 4 g. of butane diol-(1.4)-divinyl ether and 0.4 g. of azoisobutyrodinitrile, suspended in 1,200 ml. of a 0.5% polyvinyl alcohol solution, is polymerized and worked up. Gel bed volume (tetrahydrofuran): 5.4 ml./g.

(b) Analogously to Example 10(b), 35 g. of a gel produced according to Example 11(a), are saponified. The gel has in water a gel bed volume of 100 ml.

Example 12

Analogously to Example 1(a), a mixture of 184 g. of vinyl acetate, 16 g. of butane diol-(1.4)-divinyl ether, 0.6 g. of azoisobutyrodinitrile, 86 g. of hexyl alcohol and 86 g. of di-n-butyl ether, suspended in 1,200 ml. of a 0.5% polyvinyl alcohol solution, are polymerized and worked up.

Example 13

A mixture consisting of 50 g. of vinyl acetate, 2.9 g. of dimethyl-diallyl silane and 0.3 g. of azoisobutyrodinitrile is heated to 70° C. under nitrogen in a flask equipped with a reflux cooler. After 4 hours the reaction mixture is heated up to 120° C. and after a further 3 hours it is cooled off. One obtains a colorless, tough-elastic resin as a reaction product, which is swellable in tetrahydrofuran. The gel swelled in tetrahydrofuran is pressed through a sieve with a width of mesh of 0.1 mm. and is put into 10 times the quantity of water. Through 3 to 4 times decanting and washing with the same quantity of water, the gel will be completely shrunk. The granulated product is liberated of any water adhering to it in a vacuum dryer at 50° C. and can then be sifted.

Example 14

A mixture consisting of 25 g. of vinyl acetate, 2.5 g. of divinyl sulfon and 0.2 g. of azoisobutyrodinitrile is heated to 60° C. under nitrogen in a flask equipped with a reflux cooler and is kept at this temperature for 12 hours. After that, it is cooled and there is obtained a white opaque, tough resin, which is swellable in tetrahydrofuran.

Example 15

Analogously to Example 1(a), a mixture of 140 g. of vinyl acetate, 16 g. of butane diol-(1.4)-divinyl ether, 44 g. of adipic acid divinyl ester, 200 ml. n-heptyl alcohol, 100 ml. n-octane and 4 g. of azoisobutyrodinitrile, suspended in 1,000 ml. of a 0.5% polyvinylpyrrolidone solution, is polymerized and worked up. Gel bed volume (tetrahydrofuran): 6.0 ml./g.

Example 16

Analogously to Example 1(a), a mixture of 140 g. of vinyl acetate, 16 g. of butane diol-(1.4)-divinyl ether, 44 g. of adipic acid divinyl ester, 150 ml. n-heptyl alcohol, 150 ml. n-octane and 4 g. of azoisobutyrodinitrile, suspended in 1,000 ml. of a 0.3% aqueous polyvinylpyrrolidone solution, is polymerized and worked up. Gel bed volume (tetrahydrofuran): 8.6 ml./g.

(B) USE OF THE GELS IN CHROMATOGRAPHY

Example I

A polyvinyl acetate (produced according to example 9), cross-linked with a 6% butane diol-(1.4)-divinyl ether, is swelled for 24 hours in tetrahydrofuran. The suspension is filled into a chromatography pipe (1.15 x 100 cm.) which has been graduated in its upper part. During the sedimentation of the gel, one allows the elution agent to flow weakly, in order to achieve an even packing. The gel bed volume can be read directly from the graduated part. Each 1 mg. of the following 4 substances is dissolved in 0.5 ml. of tetrahydrofuran.

(1) Octamethyl octaphenyl (M=723)
(2) Tetramethyl-quaterphenyl (M=362)
(3) p-Terphenyl (M=230)
(4) Toluene (M=92)

The solution is placed on the gel bed and the column is washed out with tetrahydrofuran. The UV-permeability of the eluate is registered continuously. The 4 substances appear on the diagram tape in the form of 4 separate peaks. In the case of a gel bed volume of 99.7 ml., there are obtained the following elution volumes (peak maximum): for substance (1) 42.3 ml.; (2) 53.8 ml.; (3) 65.4 ml.; (4) 72 ml.

Example II

Analogously to Example I, a column is filled with a polyvinyl acetate gel which has been cross-linked with 1% butane diol divinyl ether (produced according to Example 10(a)), and 10 mg. of a oligomeric urethane mixture are separated. For the mixture consisting of 8 substances, one will obtain 8 different peaks. In the case of a gel bed volume of 97.0 ml., there are obtained the following values:

| Substance: | Molecular weight | Elution volumes (ml.) |
|---|---|---|
| Tetradeca-urethane | 2,001 | 42.1 |
| Dodeca-urethane | 1,727 | 45.3 |
| Deca-urethane | 1,442 | 48.8 |
| Octa-urethane | 1,167 | 53.6 |
| Hexa-urethane | 893 | 58.3 |
| Tetra-urethane | 618 | 65.8 |
| Di-urethane | 344 | 74.5 |
| Diphenyl urea | 212 | 81.4 |

Example III

A copolymer (bead size of the unsaponified product 0.05 to 0.1 mm.) produced from vinyl acetate and 2% butane diol-(1.4)-divinyl ether and saponified analogously to Example 11(b), is filled into a column of 1.6 x 33 cm. in a swelled condition, and is equilibrated with water of a pH-value of 8. A mixture of 20 mg. azoalbumin and 20 mg. of sodium chloride dissolved in 1 ml. of water of pH 8 is put on this column. It is eluated with water of a pH-value of 8 and the eluate is captured in fractions of 3.5 ml. The running through speed amounts to 42 ml./h. The elution of the albumin substance is followed through measurement at 280 nm. (millimicron) that of the salt is followed through measurement of its conductivity. The entire azoalbumin is found again in the fractions 5 and 6. The fractions 11 and 12 contain the entire sodium chloride. The azoalbumin is eluated quantitatively without retaining a residue on the column.

Example IV

A copolymer consisting of vinyl acetate and 1% butane diol-(1.4)-divinyl ether, obtained analogously to Example 10(b), and saponified, is filled in its swelled state into a column of 1.6 x 35 cm. and is equilibrated with water of a pH-value of 8. A sample of 20 mg. of azoalbumin and 20 mg. of sodium chloride, dissolved in 1 ml. of water is separated under the same conditions as in Example 3. The running through speed amounts to 25 ml./h. The azoalbumin is eluated quantitatively with the fractions 6 to 8, while the sodium chloride will appear only in the fractions 11 to 14.

Example V

A solution of 60 mg. of dextrane-blue 2,000 (Commercial product of the firm Pharmacia, Sweden) and 60 mg. of potassium chromate in 2 ml. of water of a pH-value of 8 is placed above a column filled analogously to Example III and under the conditions there described. The elution takes place analogously to Example III. The dextrane-blue is eluated quantitatively in the fractions 5 to 7. The potassium chromate is found in the fractions 11 to 13.

Example VI

A gel produced according to Example 11(b) is filled into a column of 1.5 x 26 cm. and is equilibrated with $Na_2HPO_4$/citrate-buffer solution of 0.1/0.05 m. pH 6.0. In a volume of 0.5 ml. of this buffer solution, a mixture consisting of 25 mg. of insulin and 5 mg. oxytocin is delivered and eluated with this buffer solution. The fractionating volume amounts to 1.5 ml., the running through speed to 60 fractions/h. The elution is followed through conversion of the fractions with folic reagent and measurement at 750 nm. The insulin is intercepted in the fractions 14–22, the oxytocin in the fractions 29–36.

Various changes may be made in the details and specific embodiments of this invention as previously described without departing therefrom or sacrificing the advantages thereof.

What is claimed is:

1. In a chromatographic process of separating a mixture of substances having different molecular weights, comprising the step of passing said mixture through a bed of solvent swollen granules of a polymerization product, the improvement comprising employing as said polymerization product a member selected from the group consisting of:
   (3) a cross-linked copolymer of a monovinyl ester of a carboxylic acid having up to 20 carbon atoms and a cross-linkable divinyl compound selected from the group consisting of a divinyl ether of an alkane-diol, a divinyl ether of an ethylene glycol, a divinyl ether of a propylene glycol, and a divinyl ester of a dicarboxylic acid,
   (b) a partial saponification product of said cross-linked copolymer,
   (c) a complete saponification product of said cross-linked copolymer, and
   (d) mixtures thereof.

2. A process as defined by claim 1 wherein said monovinyl ester comprises a mixture of a higher fatty acid containing 12–18 carbon atoms and a vinyl acetate or vinyl propionate.

3. A process as defined by claim 1 wherein said monovinyl ester is an aliphatic ester and said divinyl compound is selected from the group consisting of 1,4-butanediol divinyl ether, 1,6-hexanediol divinyl ether, ethylene glycol divinyl ether, and diethylene glycol divinyl ether.

4. A process as defined by claim 1 wherein said monovinyl ester is vinyl acetate.

5. A process as defined by claim 4 wherein said divinyl compound is 1,4-butanediol divinyl ether.

6. A process as defined by claim 4 wherein said divinyl compound is 1,6-hexanediol divinyl ether.

7. A process as defined by claim 4 wherein said divinyl compound is ethylene glycol divinyl ether.

8. A process as defined by claim 4 wherein said divinyl compound is diethylene glycol divinyl ether.

9. A process as defined by claim 4 wherein said divinyl compound is a divinyl ester of a dicarboxylic acid.

References Cited

UNITED STATES PATENTS

| | | | |
|---|---|---|---|
| 2,722,525 | 11/1955 | Price et al. | 260—77.5 |
| 2,847,402 | 8/1958 | Gluesenkamp et al. | 260—77.5 |
| 2,930,779 | 3/1960 | Drechsel | 260—77.5X |
| 3,002,823 | 10/1961 | Flodin et al. | 210—198X |
| 3,298,925 | 1/1967 | Mosbach | 210—198X |
| 3,369,007 | 2/1968 | Flodin | 210—198X |

JAMES L. DECESARE, Primary Examiner

U.S. Cl. X.R.

260—77.5